United States Patent
Xu et al.

(10) Patent No.: US 11,800,091 B2
(45) Date of Patent: Oct. 24, 2023

(54) METHOD AND APPARATUS FOR INTRA BLOCK COPY IN INTRA-INTER BLENDING MODE AND TRIANGLE PREDICTION UNIT MODE

(71) Applicant: Tencent America LLC, Palo Alto, CA (US)

(72) Inventors: Xiaozhong Xu, State College, PA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/668,705

(22) Filed: Feb. 10, 2022

(65) Prior Publication Data

US 2022/0166972 A1    May 26, 2022

Related U.S. Application Data

(63) Continuation of application No. 16/562,013, filed on Sep. 5, 2019, now Pat. No. 11,284,066.

(60) Provisional application No. 62/743,967, filed on Oct. 10, 2018, provisional application No. 62/743,933, filed on Oct. 10, 2018.

(51) Int. Cl.
| | | |
|---|---|---|
| *H04N 19/105* | (2014.01) | |
| *H04N 19/176* | (2014.01) | |
| *H04N 19/593* | (2014.01) | |
| *H04N 19/503* | (2014.01) | |

(52) U.S. Cl.
CPC ......... *H04N 19/105* (2014.11); *H04N 19/176* (2014.11); *H04N 19/503* (2014.11); *H04N 19/593* (2014.11)

(58) Field of Classification Search
CPC .. H04N 19/105; H04N 19/176; H04N 19/503; H04N 19/593
USPC ..................................................... 375/240.12
See application file for complete search history.

(56) References Cited

U.S. PATENT DOCUMENTS

| 10,027,981 B2 | 7/2018 | Xu et al. |
| 2011/0206119 A1 | 8/2011 | Bivolarsky et al. |
| 2011/0249745 A1 | 10/2011 | Chen et al. |

(Continued)

FOREIGN PATENT DOCUMENTS

| EP | 3180917 A1 | 6/2017 |
| EP | 3788782 A1 | 3/2021 |

OTHER PUBLICATIONS

Supplementary European Search Report dated Aug. 4, 2022 in Application No. 19870168.2, 15 pages.

(Continued)

*Primary Examiner* — Matthew David Kim
(74) *Attorney, Agent, or Firm* — ARENTFOX SCHIFF LLP

(57) ABSTRACT

A method of video decoding includes creating a candidate list for a current block in current picture included in a coded video bitstream. The method further includes determining a coding mode for at candidate block associated with the current block. The method further it determining whether to add, to the candidate list, a vector associated the candidate block based on the determined coding mode. The method further includes reconstructing the current block using at least one candidate from the candidate list.

20 Claims, 15 Drawing Sheets

(56) References Cited

U.S. PATENT DOCUMENTS

| | | | |
|---|---|---|---|
| 2013/0272411 A1* | 10/2013 | Tu | H04N 19/105 375/240.16 |
| 2016/0330474 A1 | 11/2016 | Liu et al. | |
| 2017/0054996 A1 | 2/2017 | Xu et al. | |
| 2017/0094271 A1 | 3/2017 | Liu et al. | |
| 2017/0142418 A1* | 5/2017 | Li | H04N 19/159 |
| 2017/0195677 A1 | 7/2017 | Ye et al. | |
| 2017/0295370 A1 | 10/2017 | Xu et al. | |
| 2017/0310961 A1 | 10/2017 | Liu et al. | |
| 2018/0048900 A1* | 2/2018 | Lainema | H04N 19/11 |
| 2019/0068967 A1* | 2/2019 | Ikai | H04N 19/117 |
| 2019/0200040 A1* | 6/2019 | Lim | H04N 19/176 |
| 2019/0208203 A1* | 7/2019 | Tsukuba | H04N 19/46 |
| 2020/0204824 A1* | 6/2020 | Lai | H04N 19/126 |
| 2020/0260071 A1* | 8/2020 | Hannuksela | H04N 19/51 |
| 2021/0076029 A1* | 3/2021 | Han | H04N 19/107 |

OTHER PUBLICATIONS

Toma T, et al: "Description of SDR video coding technology proposal by Panasonic", 10. JVET Meeting; Oct. 4, 2018-Apr. 20, 2018; San Diego; (The Joint Video Exploration Team of ISO/IEC JTC1/SC29/WG11 and ITU-T SG.16 ); URL: http://phenix.int-âevry.fr/JVET/,,no. JVET-J0020-v2, Apr. 12, 2018.

Ahn Y, et al: "Diagonal motion partitions on top of QTBT block structure", 8. JVET Meeting; Oct. 18, 2017-Oct. 25, 2017; Macau; (The Joint Video Exploration Team of ISO/IEC JTC1/SC29/WG11 and ITU-T SG.16 ), No. JVET-H0087, Oct. 19, 2017.

Xu, et al., "Intra Block Copy in HEVC Screen Content Coding Extensions," IEEE Journal on Emerging and Selected, Topics Circuits Systems, vol. 6, No. 4, pp. 409-419, 2016. (11 pages).

Liu, et al., "Overview of HEVC extensions on screen content coding," APSIPA Transactions on Signal and Information Processing, SIP (2015), vol. 4, e10, p. 1 of 12 (12 pages).

Joshi, et al., "High Efficiency Video Coding (HEVC) Screen Content Coding: Draft Text 6," JCTVC-W1005-v4, Proceeding of 23rd JCT-VC meeting, San Diego, CA, USA, Feb. 2016 (673 pages).

Lai, et al., "AHG14: Intra Block Copy reference area for Wavefront Parallel Processing (WPP)," JCTVC-S0101-r1, Proceeding of the 19th JCT-VC meeting, Strasburg, France, Oct. 2014 (4 pages).

Xu et al., "Block Vector Prediction in Intra Block Copy for HEVC Screen Content Coding," Data Compression Conference (DCC), Apr. 2015 (10 pages).

Xu, et at., "Non-CE2, Intra BC merge mode with default candidates." JCTVC-S0123, Proceeding of the 19th .JCT-VC meeting, Strasbourg, France. Oct. 2014 (7 pages).

Sun, et al., "Improvernents of HEVC SCC Palette Mode and Intra Block Copy," IEEE Journal on Emerging and Selected. Topics Circuits Systems, vol. 6, No. 4 pp. 453-445, 2016 (13 pages).

Xu, et al., "On chroma motion vector derivation for intra block copy," JCTVC-U0077, Proceeding of the 19th JCT-VC meeting, Warsaw, Poland. Jun. 2015 (10 pages).

Xu, et al., "On reference picture list construction for intra block copy," JCTVC-U0113, Proceeding of the 19th JCT-VC meeting, Warsaw, Poland, Jun. 2015 (6 pages).

Xu, et al. "On storage of filtered ants unfiltered current decoded pictures", JCTVC-U0181, Proceeding of the 19th JCT-VC meeting, Warsaw, Poland, Jun. 2015 (2 pages).

Xu, et al., "On intra block copy signaling and constraints," JCTVC-V0056, Proceeding of the 22nd JCT-VC meeting, Geneva, Switzerland, Oct. 2015 (5 pages).

Xu, et al, "DPB considerations when current picture is a reference picture," JCTVC-V0057, Proceeding of the 22nd JCT-VC meeting, Geneva, Switzerland, Oct. 2015 (5 pages).

Xu, et al., "Bug fix for DPB operations when current picture is a reference picture," JCTVC-W0077r1, Proceeding of the 23rd JCT-VC meeting, San Diego, CA, USA, Feb. 2018 (5 pages).

Chen, et al., "Intra Line Copy for HEVC Screen Content", IEEE Transactions on Circuits and Systems for Video Technology, vol. 27, Issue 7, pp. 1568-1579, Jul. 2017. (12 pages).

Chen, et al., "Algorithm Description of Joint Exploration Test Model 7 (JEN 7)," JVET-G1001-v1, Joint Video Exploration Team (JVET) of ITU-T SG 16 WP 3 and ISO/IEC JTC 1/SC 29/WG 117th Meeting. Torino, IT, Jul. 13-21, 2017 (48 pages).

Songwei, et al., "Deformable Motion Model For Frame Rate Up-Conversion in Video Coding," 2016 IEEE Region 10 Conference (TENCON), Nov. 2016 (4 pages).

Kamp, et al., "Decoder-Side Motion Vector Derivation for Block-Based Video Coding," IEEE Transactions on Circuits and Systems for Video Technology, vol. 22, Issue 12, pp. 1732-1745, Dec. 2012) (14 pages).

High efficiency video coding (HEVC), Rec. ITU-T H.265 v4, Dec. 2016. (664 pages).

Venugopal, et al., "Intra Region-based Template Matching," JVET-J0039, 10th JVET meeting, Apr. 2018. (12 pages).

Joshi, et al., "High Efficiency Video Coding (HEVC) Screen Content Coding Draft 3," ITU-T/ISO/IEC, JCTVC-T1005, Feb. 2015. (563 pages).

Joshi, et al., "Screen content coding test model 5 (SCM 5)," Joint Collaborative Team on Video Coding (JCT-VC) meeting, JCTVC-U1014, 2015. (12 pages).

Xu, et al., "Description of Core Experiment 8: Current Picture Referencing," JVET-K1028-V4, 11th JVET meeting, Jul. 2018. (11 pages).

Chiang, et al., "CE10.1.1: Multi-hypothesis prediction for improving AMVP mode, skip or merge mode and intra mode," JVET-L0100-v3, Oct. 2018. (14 pages).

Liao, et al., "CE10.3.1.b: Triangular prediction unit mode," JVET-L0124-v2, Oct. 2018. (8 pages).

International Search Report and Written Opinion dated Dec. 20, 2019 in PCT/US/19/53819.

* cited by examiner

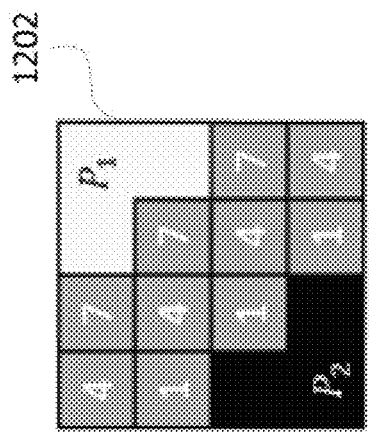
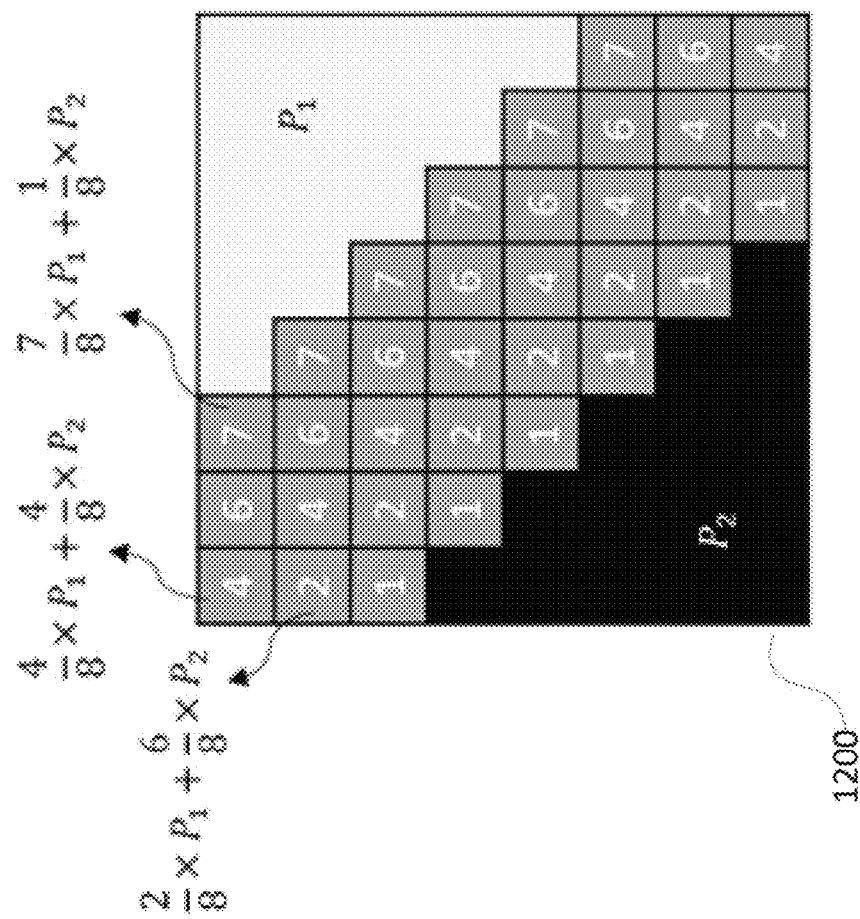
FIG. 12

US 11,800,091 B2

METHOD AND APPARATUS FOR INTRA BLOCK COPY IN INTRA-INTER BLENDING MODE AND TRIANGLE PREDICTION UNIT MODE

INCORPORATION BY REFERENCE

This application is a continuation of application Ser. No. 16/562,013, filed Sep. 5, 2019, which claims the benefit of priority to U.S. Provisional Application No. 62/743,967, "INTRA BLOCK COPY IN INTRA-INTER BLENDING MODE" filed on Oct. 10, 2018, and U.S. Provisional Application No. 62/743,933, "INTRA BLOCK COPY IN TRI-ANGLE PREDICTION UNIT MODE" filed on Oct. 10, 2018, each of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that, may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit, per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using loss y compression, the reconstructed signal may not be identical to the original signal, but the distortion between original and reconstructed signals is small enough to make the reconstructed signal useful for the intended application. In the case of video lossy compression is widely employed. The amount of distortion tolerated depends on the application; for example, users of certain consumer streaming applications may tolerate higher distortion than Users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016. Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

According to an exemplary embodiment, a method of video decoding includes creating a candidate list for a current block in a current picture included in a coded video bitstream. The method further includes determining a coding mode for a candidate block associated with the current block. The method further includes determining whether to add, to the candidate list, a vector associated the candidate block based on the determined coding mode. The method further includes reconstructing the current block using at least one candidate from the candidate list.

According to an exemplary embodiment, a video decoder for video decoding includes processing circuitry configured to create a candidate list for a current block in a current picture included in a coded video bitstream. The processing circuitry is further configured to determine a coding mode for a candidate block associated with the current block. The processing circuitry is further configured to determine whether to add, to the candidate list, a vector associated the candidate block based on the determined coding mode. The processing circuitry is further configured to reconstruct the current block using at least one candidate from the candidate list.

BRIEF DESCRIPTION OF THE DRAWINGS

Further features, the nature, and various advantages of the disclosed subject matter will be more apparent from the following detailed description and the accompanying drawings in which:

FIG. 12 is a schematic illustration of blocks with applied weighting factors in accordance with embodiments of the present disclosure.

DETAILED DESCRIPTION OF EMBODIMENTS

Figure 1:
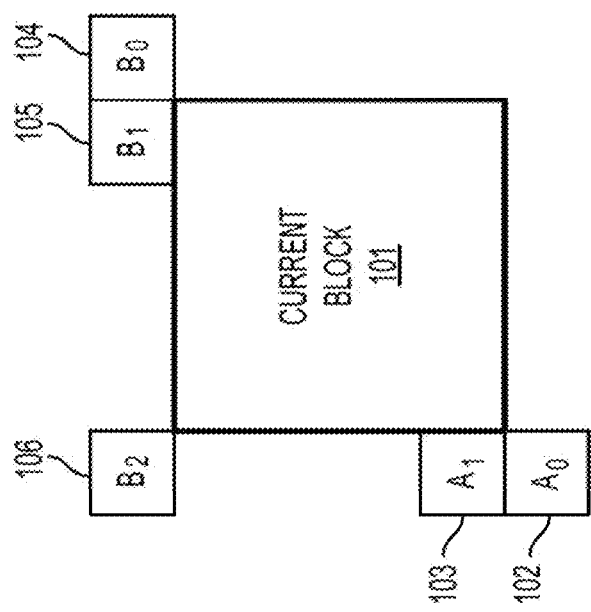
FIG. 1 is a schematic illustration of a current block and its surrounding spatial merge candidates in one example.
Figure 2:
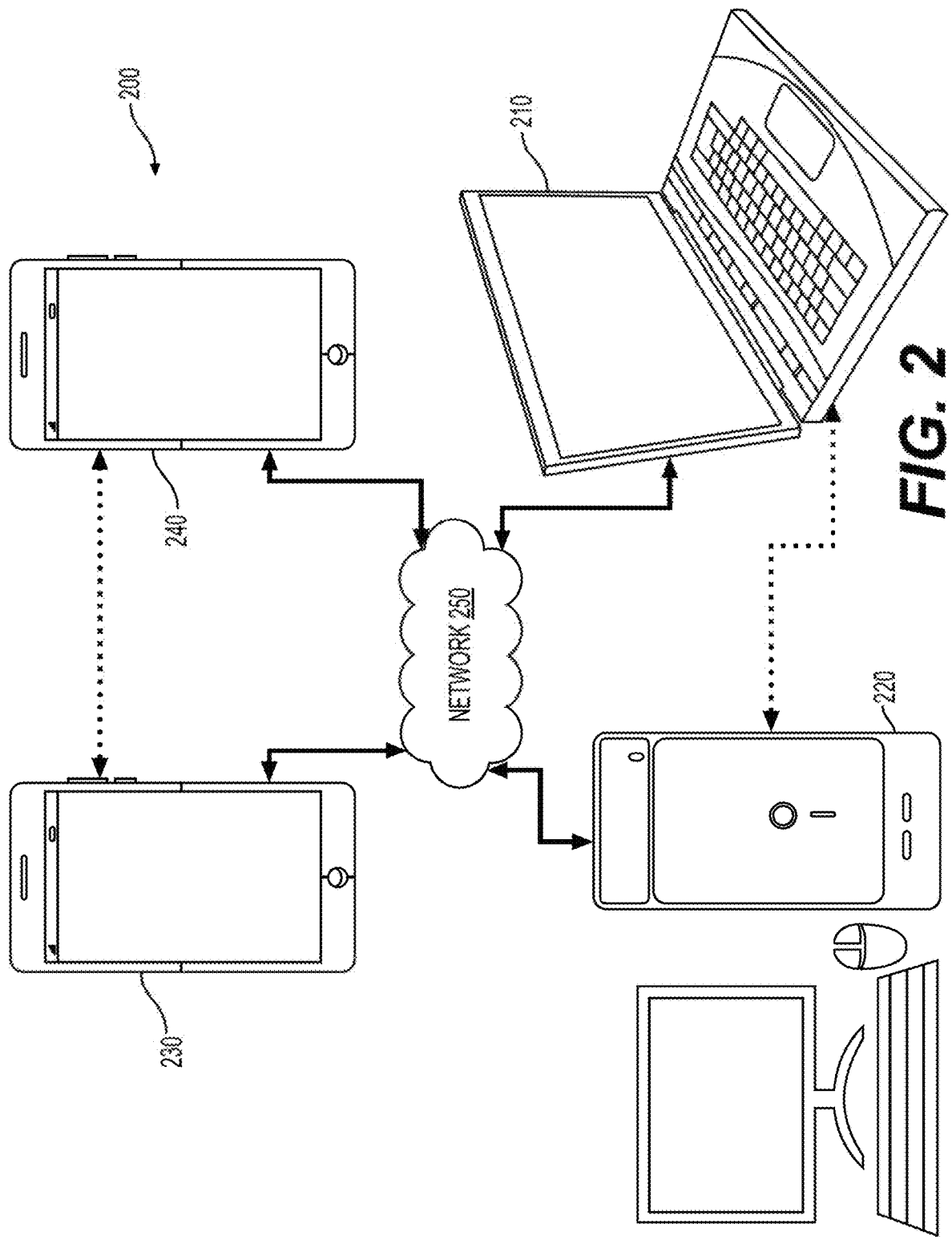
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that per ones bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
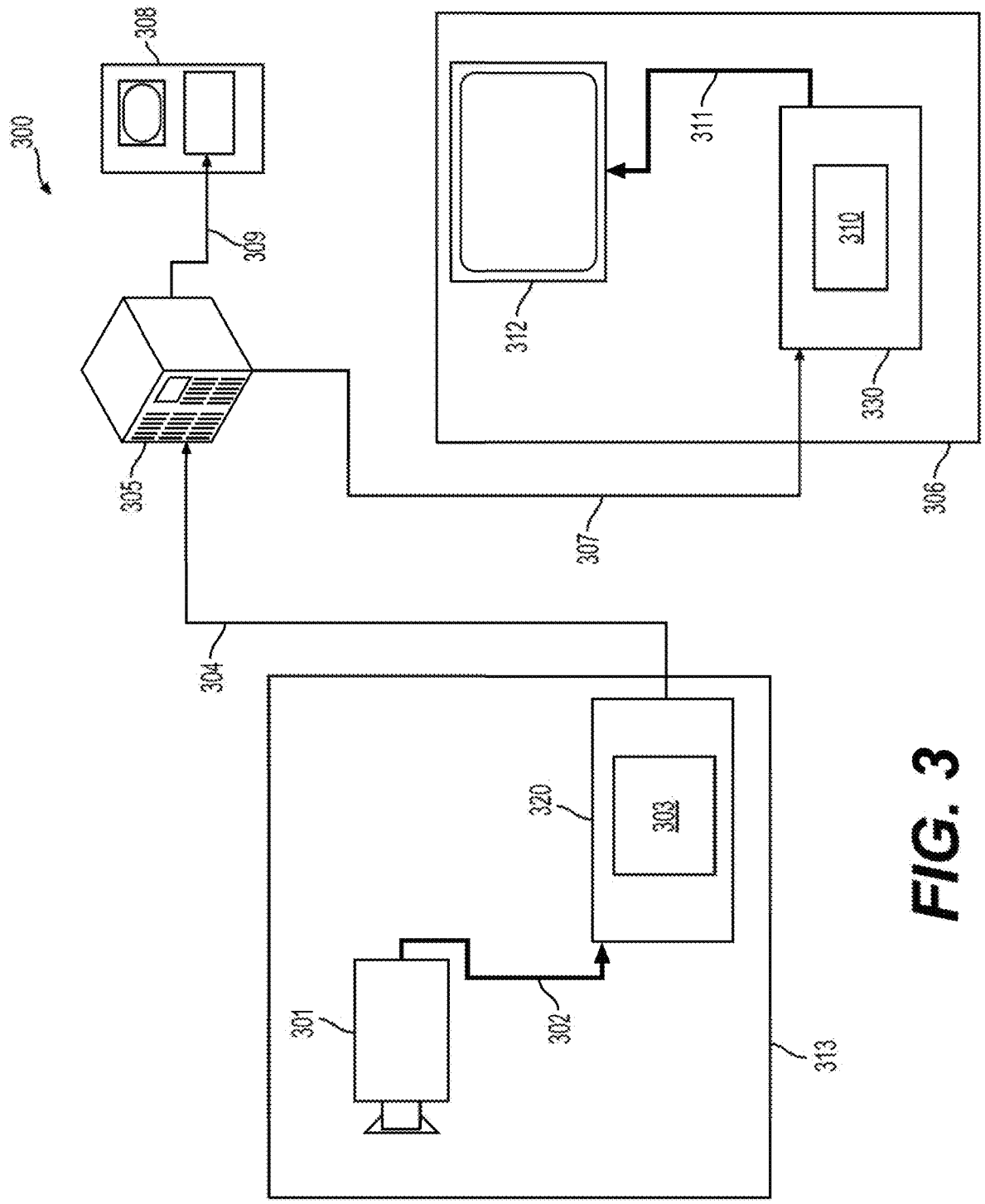
FIG. 3 is a schematic illustration, of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding compression standards. Examples of those standards include ITIU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
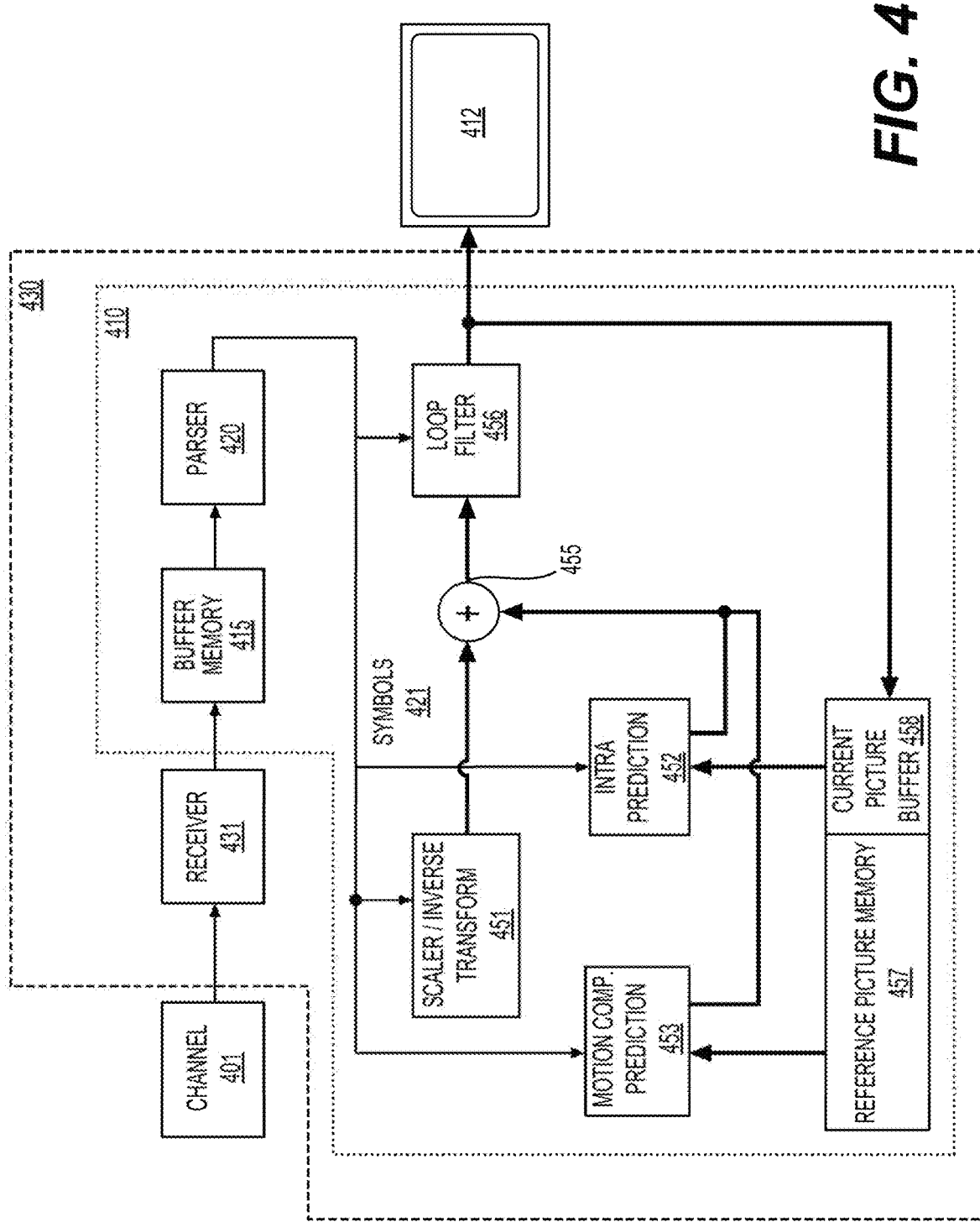
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic, device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video dam with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store forward device of sufficient bandwidth and controllability, or front an isosynchronous network, the buffer memory (415) may not be needed, or can be small. For use on best effort packet networks such as the Internet, the buffer memory (415) may be required can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or hilly reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the sealer/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as sprawls (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be, a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to, a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data author to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
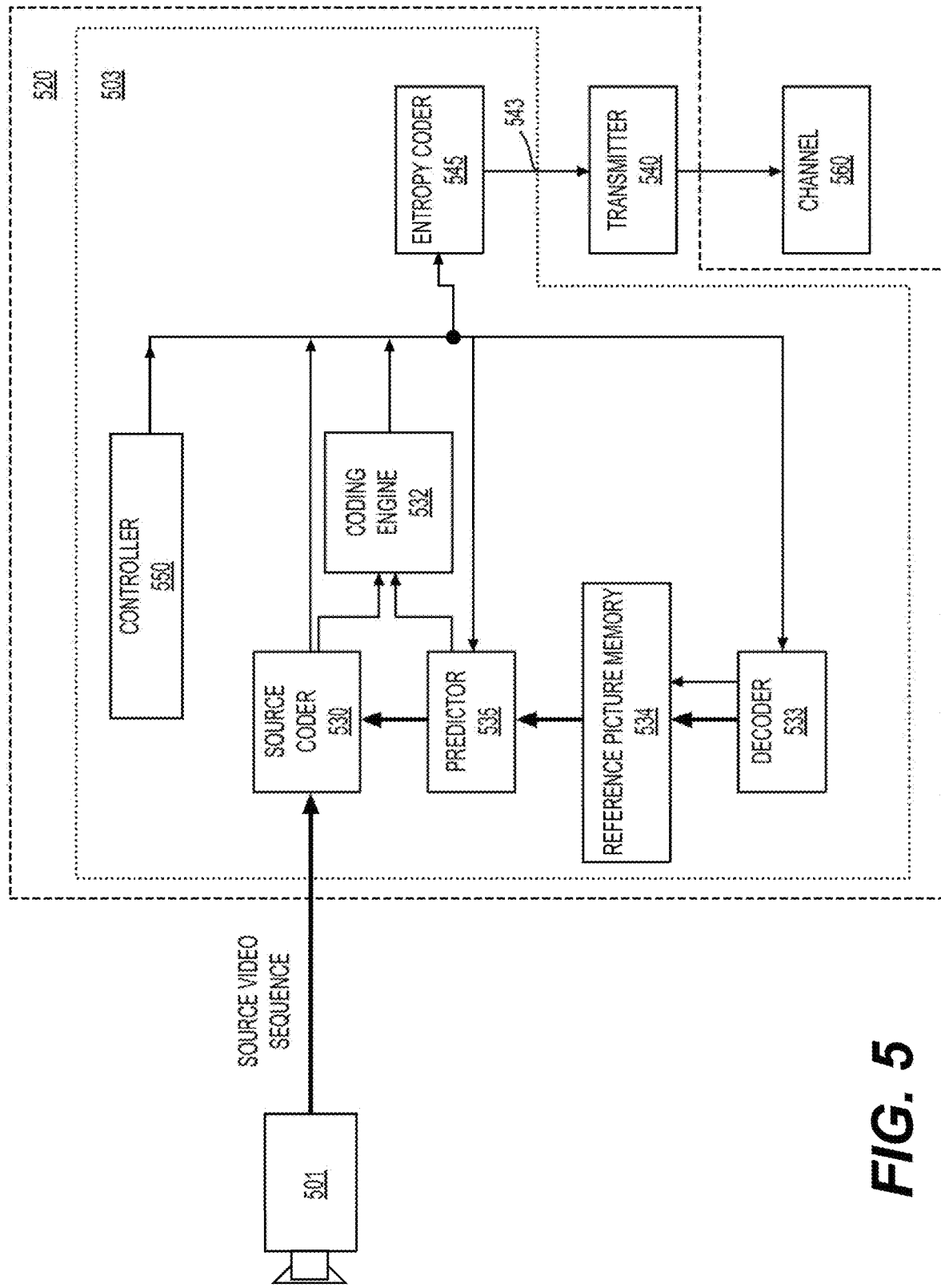
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or, more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) cart be configured to have other suitable functions that pertain to the video encoder (503) optimized for a certain system design.

In some embodiments, the video encoder (503) is configured to operate in a coding loop. As an oversimplified description, in an example, the coding loop Can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to One or more previously-coded picture from the video sequence that were designated as "reference pictures". In this manner, the coding engine (532) codes differences between pixel blocks of an input picture and pixel blocks of reference picture(s) that may be selected, as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5) the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding, engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware or those variants of I pictures and their respective applications and features.

A predictive picture (P picture) may be one that may be coded and decoded using intra prediction or inter prediction using at most one motion vector and reference index to predict the sample values of each block.

A tri-directionally predictive picture (B Picture) may be one that may be coded and decoded using Ultra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks oil pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) ma perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded, video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used, in the inter-picture prediction to improve coding efficiency.

According to some embodiments of the disclosure, predictions, such as inter-picture predictions and intra-picture predictions are performed in the unit of blocks. For example, according to the HECV standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one lama CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
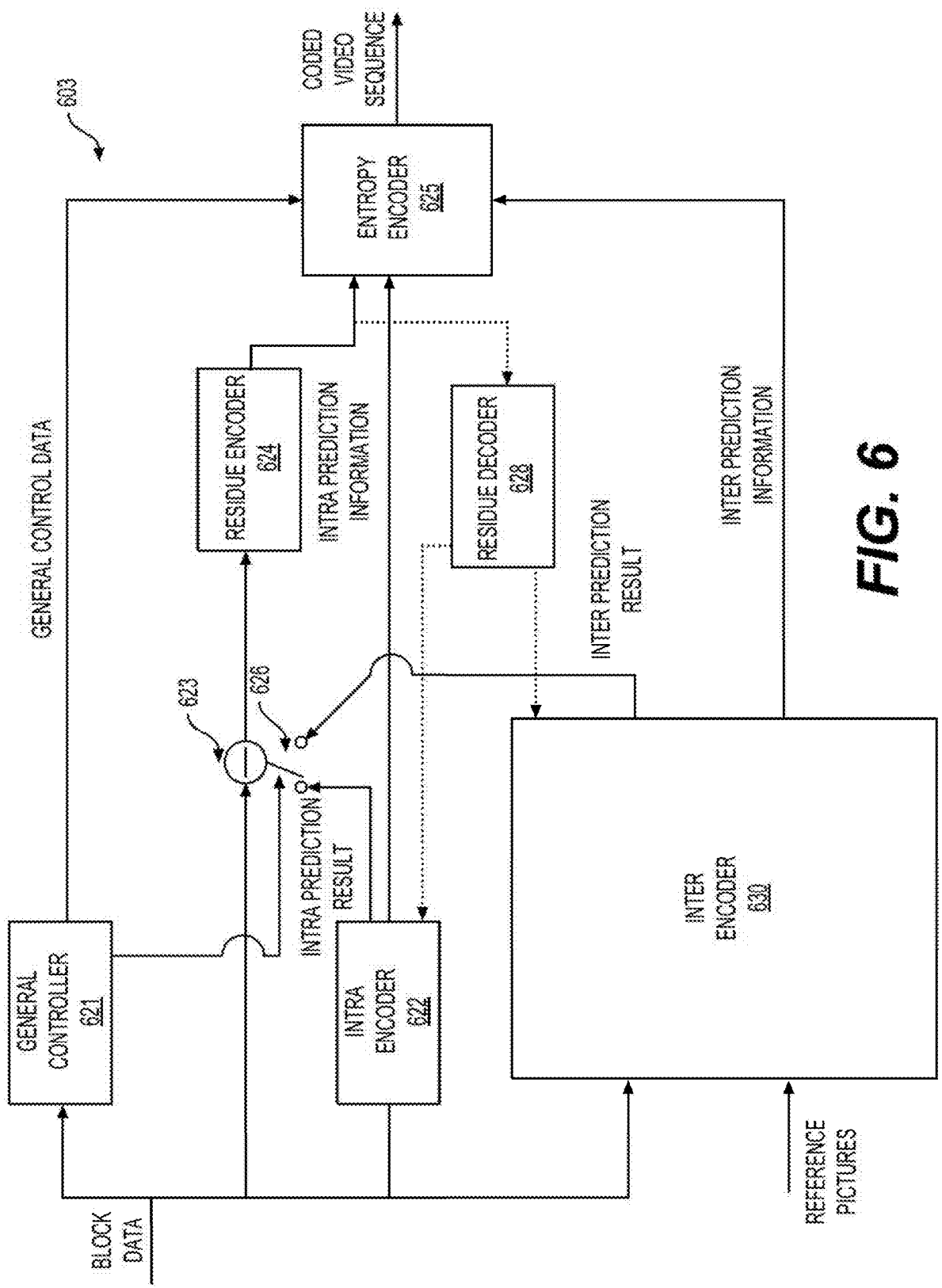
FIG. 6 shows a block diagram of an encoder in accordance with another embodiment.

FIG. 6 shows a diagram of a video encoder (603) according to another embodiment of the disclosure. The video encoder (603) is Configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together, as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (6240 is configured to operate based, on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (2622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
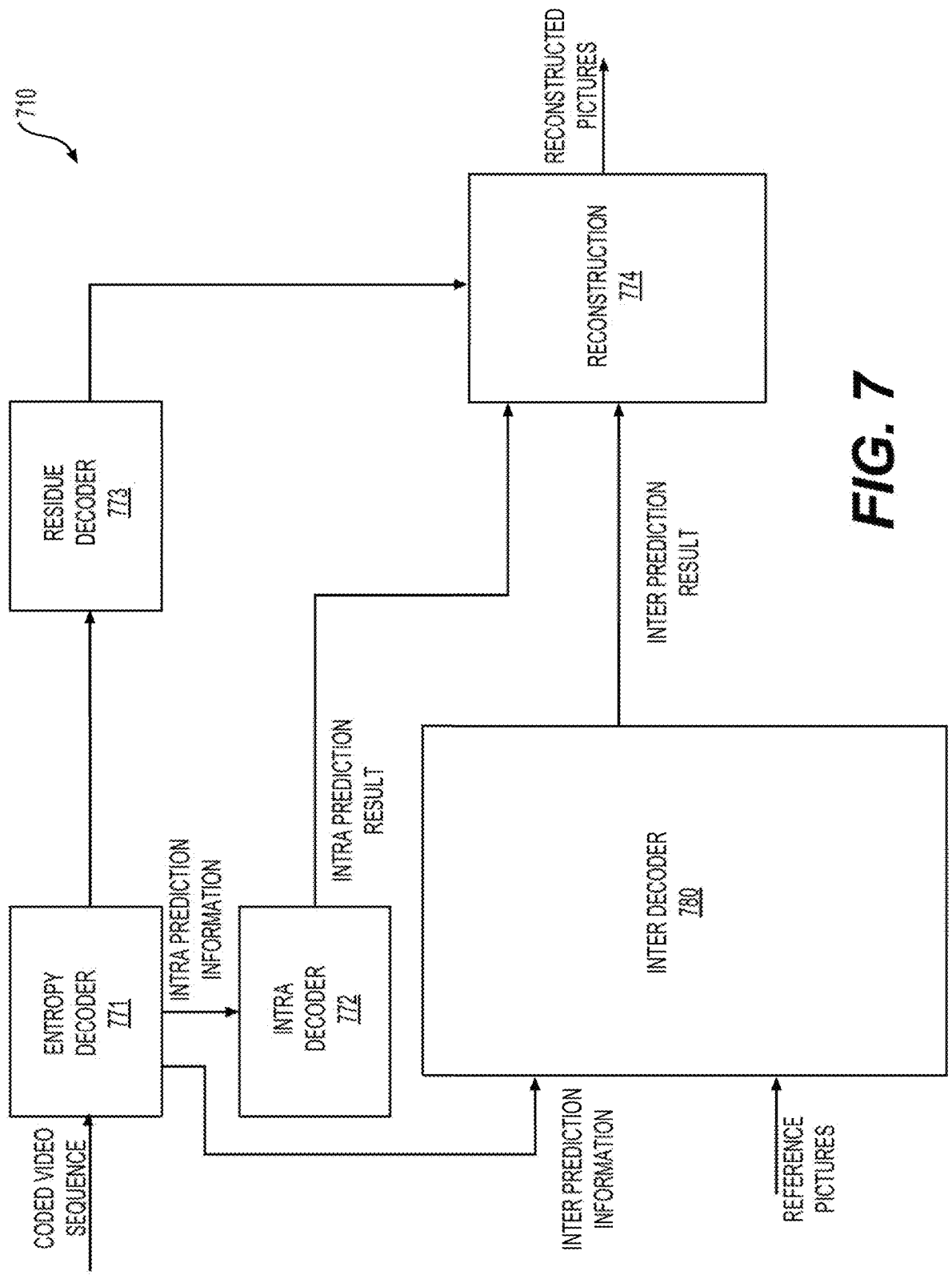
FIG. 7 shows a block diagram of a decoder in accordance with another embodiment.

FIG. 7 Shows a diagram of a video decoder (710) according to another embodiment of the disclosure. The video decoder (710) is configured to, receive coded pictures that are part of a coded video sequence, and decode the coded pictures to generate reconstructed pictures. In an example, the video, decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the Ultra decoder (772) or the inter decoder (780), respectively, residual information in the form of for example, quantized transform coefficients, and the like. In an example, when the prediction mode is inter or bi-predicted mode, the inter prediction information is provided to the inter decoder (780); and when the prediction type is the intra prediction type, the intra prediction information is provided to the inns, decoder (772). The residual information can be subject to inverse quantization and is provided to the residue decoder (773).

The inter decoder (780) is, configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or inns prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Block based compensation from a different picture may be referred to as motion compensation. Block compensation may also be done from a previously reconstructed area within the same picture, which may be referred to as intra picture block compensation, intra block copy (IBC), or current picture referencing (CPR). For example, a displacement vector that indicates an offset between a current block and the reference block is referred to as a block vector. According to some embodiments, a block vector points to a reference block that is already reconstructed and available for reference. Also, for parallel processing consideration, a reference area that is beyond a slice boundary or wavefront ladder-shaped boundary may also be excluded from being referenced by the block vector. Due to these constraints, a block vector may be different from a motion vector in motion compensation, where the motion vector can be at any value (positive or negative, at either x or y direction).

The coding of a block vector may be either explicit, or implicit. In an explicit mode, which is sometimes referred to as (Advanced Motion Vector Prediction) AMVP mode in inter coding, the difference between a block vector and its predictor is signaled. In the implicit mode, the block vector is recovered from the block vector's predictor, in a similar way as a motion vector in merge mode. The resolution of a block vector, in some embodiments, is restricted to integer positions. In other embodiments, the resolution of a block vector may be allowed to point to fractional positions.

The use of IBC at the block level may be signaled using a block level flag, referred to as an IBC flag. In one embodiment, the IBC flag is signaled when a current block is not coded in merge mode. The IBC flag may also be signaled by a reference index approach, which is performed by treating the current decoded picture as a reference picture. In HEVC Screen Content Coding (SCC), such a reference picture is put in the last position of the list. This special reference picture may also be managed together with other temporal reference pictures in the DPB. IBC may also include variations such as flipped IBC (e.g., the reference block is flipped horizontally or vertically before used to predict current block), or line based (IBC) (e.g., each compensation unit inside an M×N coding block is an M×1 or 1×N line).

Figure 8:
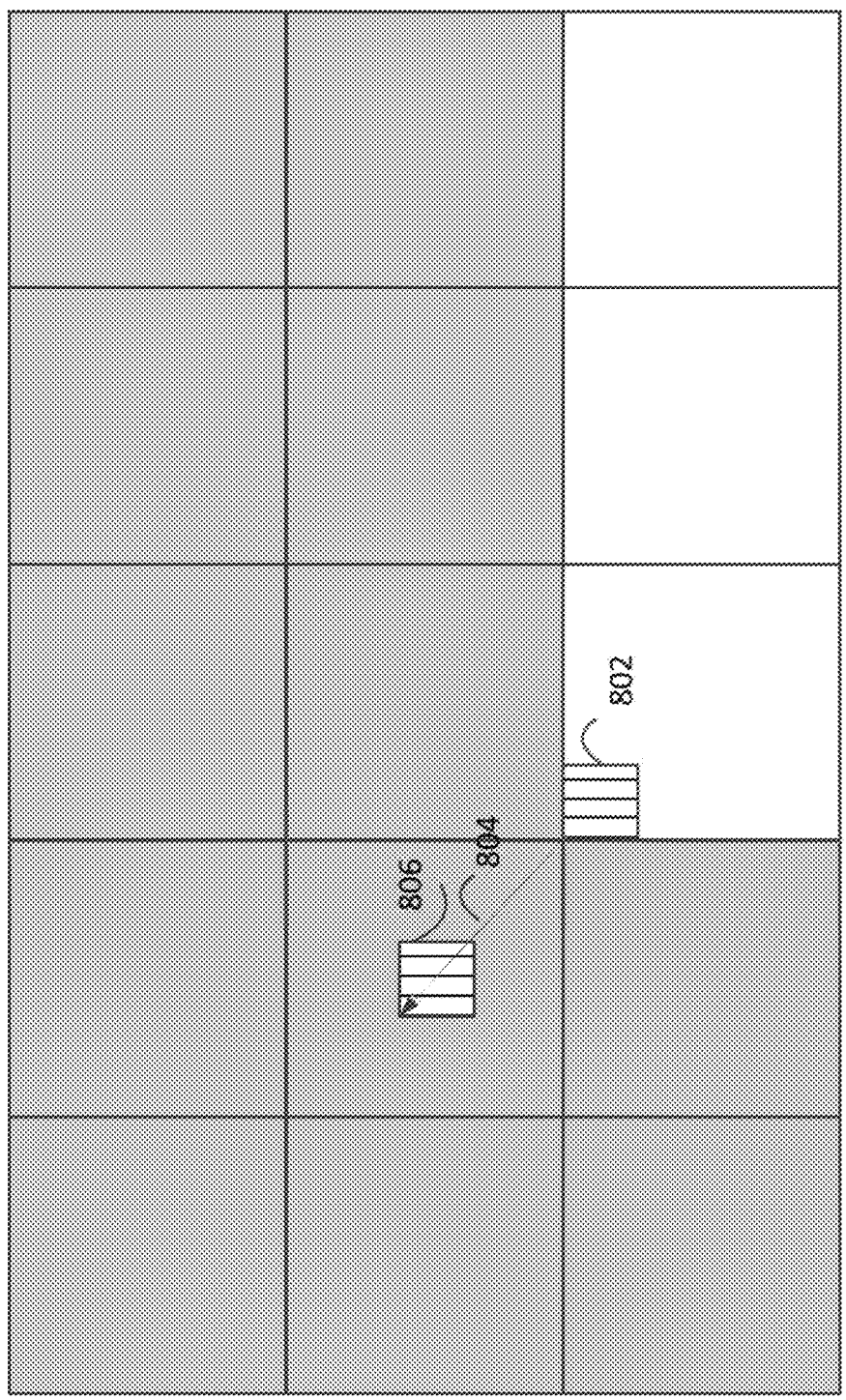
FIG. 8 is a schematic illustration of intra picture block compensation in accordance with an embodiment.

FIG. 8 illustrates an embodiment of intra picture block compensation (e.g., IBC mode). In FIG. 8, a current picture 800 includes a set of block regions that have already been coded/decoded (i.e., gray colored squares) and a set of block regions that have yet to be coded/decoded (i.e., white colored squares). A block 802 of one of the block regions that have yet to be coded/decoded may be associated with a block vector 804 that points to another block 806 that has previously been coded/decoded. Accordingly, any motion information associated with the block 806 may be used for the coding/decoding of block 802.

According to some embodiments, the reconstructed samples of the current picture are stored in a dedicated memory. Due to the cost of storing reconstructed samples in a dedicated memory, the reference area is generally not as large as a full fame, but instead, is up to the memory size. In some examples, the IBC refers to only some neighboring areas, but not the whole picture. In one example, the memory size is one CTU, which means that only when the reference block is within the same CTU as the current block, the IBC mode can be used. In another example, the memory size is two CTUs, which means that only when the reference block is either within the current CTU, or the CTU to the left of current CTU, the IBC mode can be used. In these examples, when the reference block is outside the designated local area, even if the reference block has been reconstructed, the reference samples cannot be used for intra picture block compensation.

With the constrained reference area, the efficiency of IBC is limited. Accordingly, there is a need to further improve the efficiency of IBC with a constrained reference area. Embodiments of the present disclosure provide improved efficiency of IBC with a constrained reference area.

According to some embodiments, when the multi-hypothesis prediction is applied to improve an intra prediction mode, multi-hypothesis prediction combines one intra prediction and one merge indexed prediction. For a CU coded in the merge mode, one flag may be signaled for the merge mode to select an intra mode from an intra candidate list when the flag is true.

In some embodiments, for the luma component, the intra candidate list is derived from 4 intra prediction modes including DC, planar, horizontal, and vertical modes, and the size of the intra candidate list may be 3 or 4 depending on the block shape. The intra candidate list is not limited to the previously listed 4 intra prediction modes, and can include any desired number of intra prediction directions. For example, when the CU width is two times larger than the CU height, the horizontal mode is excluded from the intra candidate list, and when the CU height is two times larger than the CU width, the vertical mode is excluded from the intra candidate list. In some embodiments, one intra prediction mode candidate selected in accordance with an intra mode index and one merge mode prediction candidate selected in accordance with a merge index are combined using a weighted average. In some embodiments, for the chroma component, the direct mode (DM) is applied without extra signaling.

According to some embodiments, the weights for combining predictions may be implemented as follows. When the DC or planar mode is selected, or the CB width or height is smaller than 4, equal weights are applied to the intra and inter prediction candidates. In some examples, for those CBs with a CR width and height larger than or equal to 4, when the horizontal/vertical mode is selected, one CB may be first vertically or horizontally split into four equal-area regions. Each weight set, denoted as $(w\_intra_i, w\_inter_i)$, where i is front 1 to 4, may be implemented as follows: $(w\_intra_1, w\_inter_1)=(6, 2)$, $(w\_intra_2, w\_inter_2)=(5, 3)$, $(w\_intra_3, w\_inter_3)=(3, 5)$, and $(w\_intra_4, w\_inter_4)=(2, 6)$. These weight sets may be applied to a corresponding region, where $(w\_inter_1, w\_inter_1)$ is for the region closest to the reference samples, and $(w\_intra_4, w\_inter_4)$ is for the region farthest away from the reference samples. After the weight sets are applied to a corresponding region, the combined prediction may be calculated by summing up the two weighted predictions and right-shifting 3 bits. Furthermore, the intra prediction mode for the intra prediction pan may be saved for reference by the following neighboring CUs.

Figure 9:
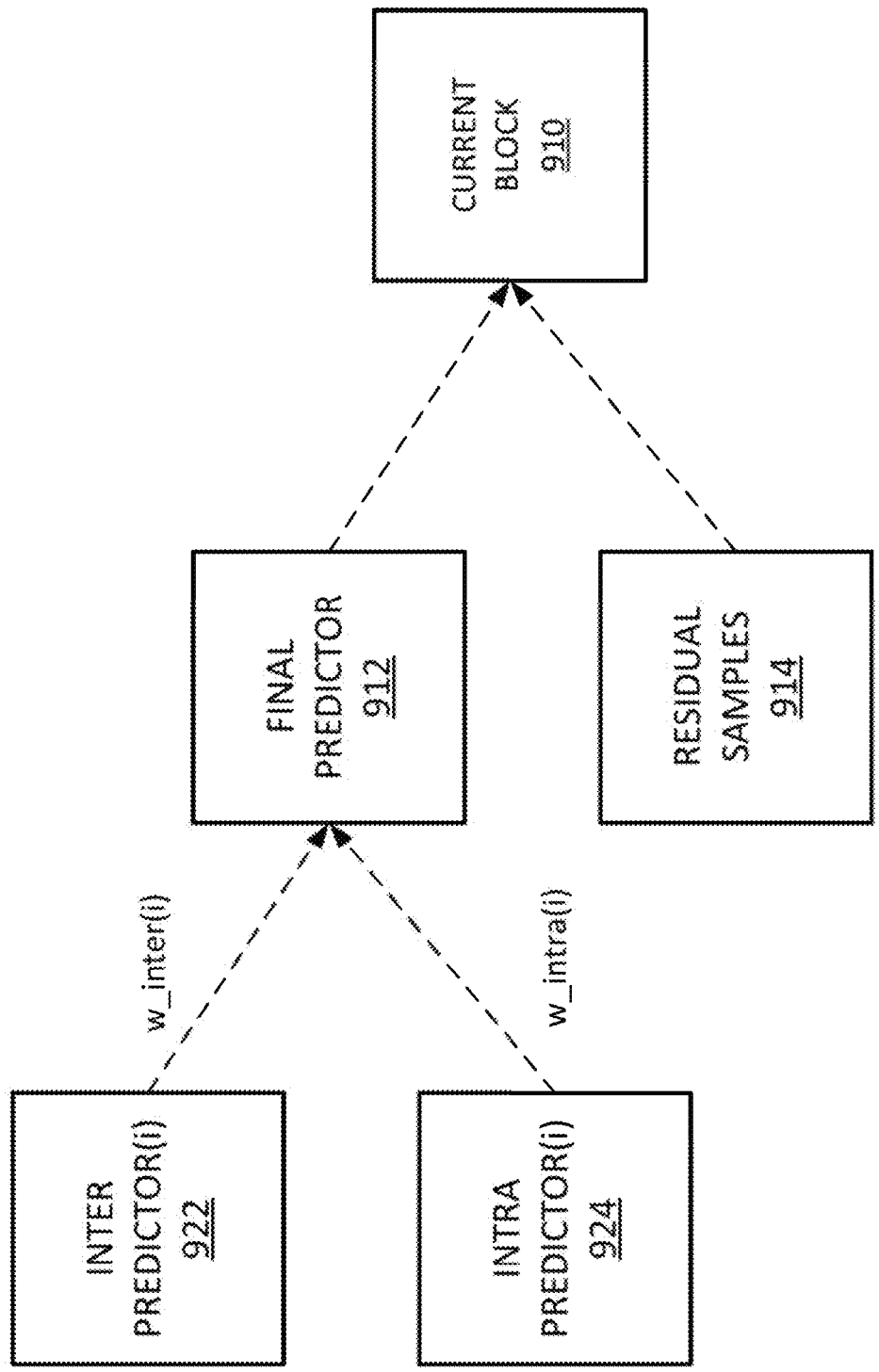
FIG. 9 is a schematic illustration of intra-inter blending mode in accordance with an embodiment of the present disclosure.

FIG. 9 illustrates an example of multi-hypothesis prediction. Inter Predictor (i) (922) and Intra Predictor (i) (924) correspond to the inter prediction and intra prediction parts for the $i^{th}$ region. The weights $w\_inter(i)$ and $w\_intra(i)$ correspond to the inter prediction and intra prediction weights, respectively, for the $i^{th}$ region. The Final Predictor (912) may be formed by combining the weighted Inter Predictor (922) and Intra Predictor (924). A current block (910) may be reconstructed using the final predictor (912) and residual samples (914). The residual sample may represent a difference between the current block (910) and the Final Predictor (912).

Generally, motion vectors are used for finding a reference block front another reference picture other than the current picture. However, when intra-inter blending mode is used, current prediction modes do not specify how to use both a motion vector and a block vector. Accordingly, there is a need to develop methods to support the method of using intra-inter blending mode when both motion compensation and IBC is allowed.

According to embodiments of the present disclosure, the term block may be interpreted as a prediction block, a coding block, or a coding unit (i.e., CU).

According to some embodiments, when the IBG mode is used, block vectors are excluded from a candidate list such as a merge mode candidate list when forming the inter predictor part in the intra-inter blending mode. For example, when a merge candidate is coded in the IBC mode, the merge candidate is considered as unavailable so that the block vector for this merge candidate is not used in the intra-inter blending mode.

According to some embodiments, when a merge candidate is coded in the IBC mode, a block vector of the merge candidate is used as the inter prediction part in intra-inter blending mode. If a block vector is selected using a merge index from the candidate list, the restrictions imposed on this block vector maybe applied to other block vectors. For example, these restrictions may require that other block vectors (e.g., any block vector such as the block vectors in the merge list, in the current block, etc.) should be pointing to a valid reference area, assuming the whole coding unit is coded using this block vector, not just the partition that uses this block vector.

According to some embodiments, block vectors are stored for each coding unit coded in intra-inter blending mode if the inter predictor is generated using a block vector. These stored block vectors may be used for other blocks that have yet to be reconstructed.

In some embodiments, when luma and chroma components have separate coding tree structures (i.e., dual-tree structure), the intra-inter blending mode is not used. For example, when this condition is met, the intra-inter blending mode is disabled.

In some embodiments, when the luma and chroma components have separate coding tree structures, the use of intra-inter blending mode is allowed. For the him component, a merge index may be signaled to select a motion vector or block vector from the candidate list, and an intra prediction mode may be signaled to select an intra prediction predictor from an intra prediction candidate list.

In some embodiments, when intra-inter blending mode is allowed for the dual-tree structure for luma and chroma components, block vectors are stored for each coding unit coded in intra-inter blending mode if the inter predictor is generated using a block vector. For the chroma component, in one embodiment, the chroma CU is not allowed to be coded in intra-inter blending mode. In another embodiment, the chroma CU can be coded in intra-inter blending mode such that each smallest chroma block's block vector or motion vector is derived from the aroma block's collocated luma sample's block vector or motion vector, provided that the corresponding luma sample is coded in IBC mode or an inter mode, respectively. Otherwise, if any of these smallest chroma blocks cannot derive a valid block vector or motion vector from the chroma block's collocated luma sample, intra-inter blending mode is not allowed for the entire chroma CU.

Figure 10:
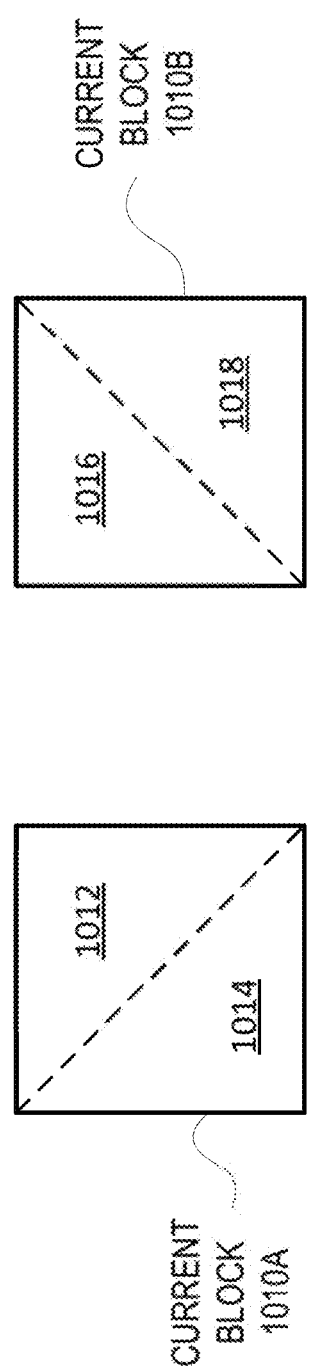
FIG. 10 is a schematic illustration of two splitting examples for a current block according, to a triangle prediction unit mode in accordance with an embodiment of the present disclosure.

According to some embodiments, a triangular prediction unit mode provides a triangle partition of a CU for motion compensated prediction. As illustrated in FIG. 10, current blocks (1010A) and (1010B) are split into two triangular prediction units. For example, current block (1010A) is split in the diagonal direction (e.g., split from top left corner to bottom right corner) to create triangular prediction units (1012) and (1014). In another example, current block 1010B is split in the inverse diagonal direction (e.g., split from top right corner to bottom left corner) to create triangular prediction units (1016) and (1018). Each triangular prediction unit in the CU ma be inter-predicted using the prediction unit's own uni-prediction motion vector and reference frame index, which may be derived from a uni-prediction candidate list. An adaptive weighting process may be performed to the diagonal edge after predicting the triangular prediction units. Then, the transform and quantization process may be applied to the whole CU. In some embodiments, the triangular prediction mode is applied to the skip and merge modes.

Figure 11:
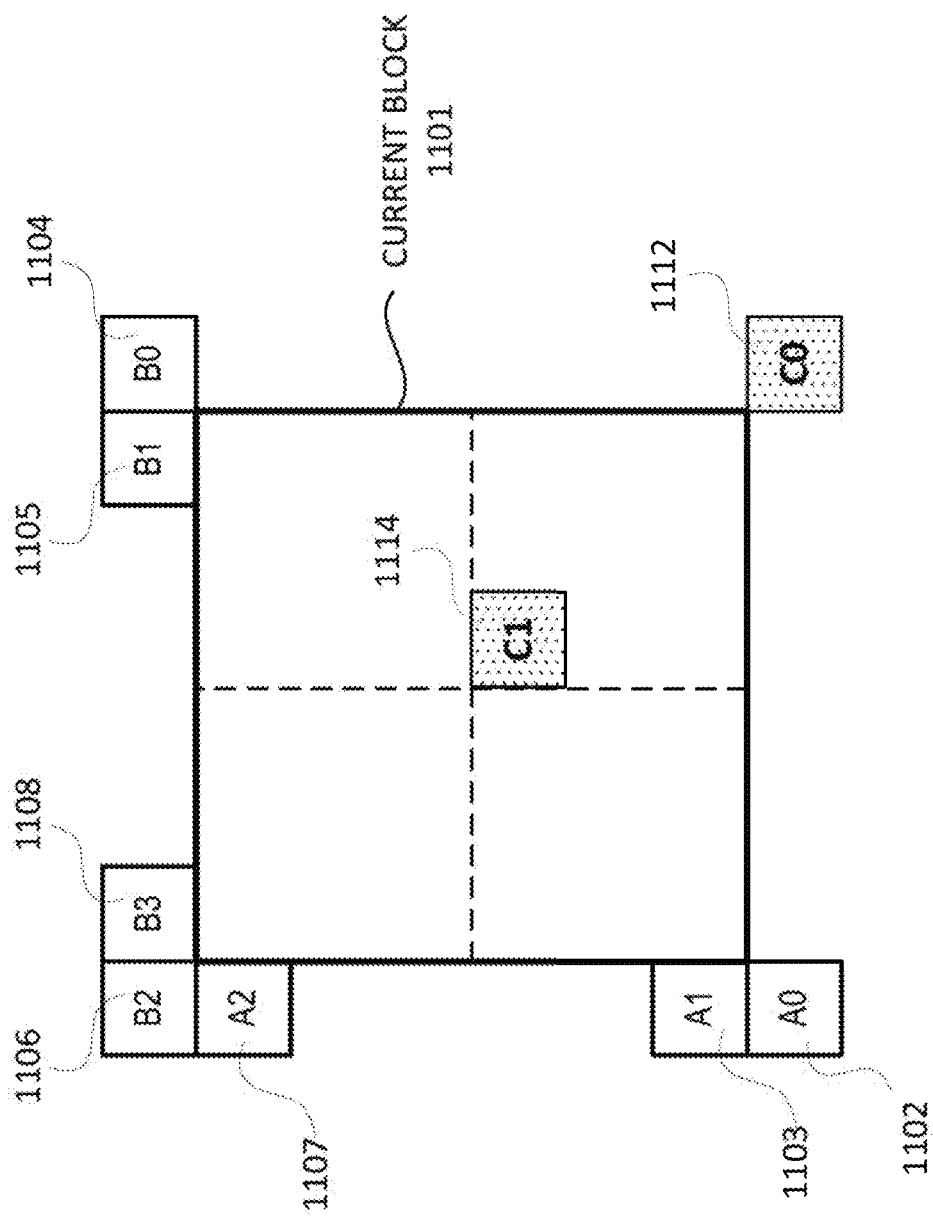
FIG. 11 is a schematic illustration of a block with spatial and temporal neighbors in accordance with an embodiment of the present disclosure.

According to some embodiments, a uni-prediction candidate list includes five uni-prediction motion vector candidates. The uni-prediction candidate list may be derived from seven neighboring blocks including five spatial neighboring blocks and two temporal co-located blocks. For example, FIG. 11 illustrates a current block 1101 with neighboring blocks A0 (1102), A1 (1103), B0 (1104), B1 (1105), B2 (1106), B3 (1108), and A2 (1107). FIG. 11 further illustrates two temporal co-located blocks C0 (1112) and C1 (1114). The motion vectors of the seven neighboring blocks may be collected and put into the uni-prediction candidate list according to an order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of, candidates is less than five, a zero motion vector may be added to the list.

According to some embodiments, after predicting each triangular prediction unit, an adaptive weighting process is applied to the diagonal edge between the two triangular prediction units to derive the final prediction for the whole CU. A first example of a weighting group ($1^{st}$ weighting factor group) may include the following set of weights: {⅞, ⅝, ⅜, ⅖, ⅛} for the luminance Samples and {⅞, ⅘, ⅛} for the chrominance samples. A second example of a weighting group ($2^{nd}$ weighting factor group) may include the following set of weights: {⅞, ⅝, ⅝, ⅘, ⅜, ⅖, ⅛} for the luminance samples and {⅝, ⅘, ⅖} for the chrominance samples. In some embodiments, one weighting factor group is selected based on a comparison of the motion vectors of two triangular prediction units. For example, the $2^{nd}$ weighting factor group may be used when the reference pictures of the two triangular prediction units are different from each other, or their motion vector difference is larger than 16 pixels. Otherwise, the $1^{st}$ weighting factor group is used.

FIG. 12 illustrates weighting factors applied along a diagonal edge of block (1200) of luminance samples, and weighting factors applied along a diagonal edge of block (1202) for chrominance samples. The areas $P_1$ and $P_2$ indicate, for example, non-weighted areas. For example, as illustrated in FIG. 12, block (1200) includes a plurality of sub-blocks, with each sub-block partitioned in accordance with the triangle prediction mode. A sub-block labeled with 7 indicates, for example, the first triangular prediction unit of this sub-block has a weighting factor of ⅞, and the second triangular prediction unit of this sub-block has a weighting factor of ⅛.

Figure 13:
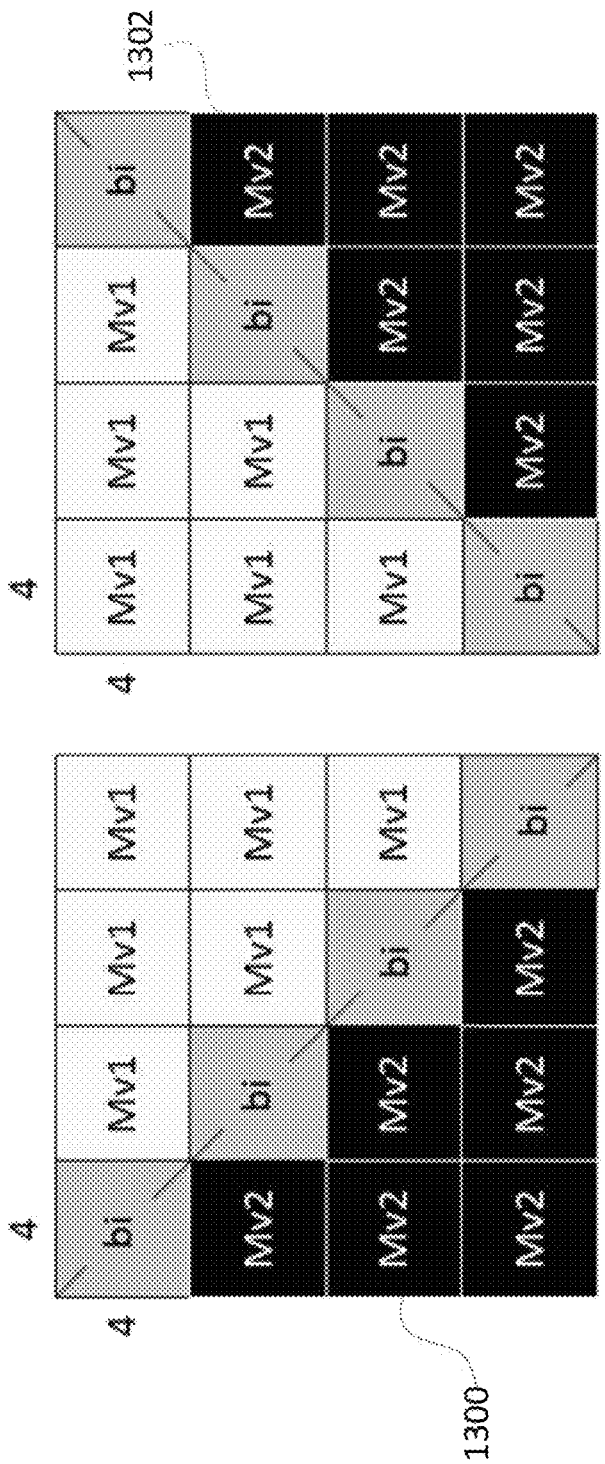
FIG. 13 is a schematic illustration of motion vector storage in accordance with embodiments of the present disclosure.

According to, some embodiments, the motion vectors (e.g., Mv1 and Mv2 for $P_1$ and $P_2$, respectively, in FIG. 12) of the triangular prediction units are stored in 4×4 grids. For each 4×4 grid, either a uni-prediction or a bi-prediction motion vector is stored depending on the position of the 4×4 grid in the block. For example, as illustrated in FIG. 13, for blocks 1300 and 1302, the uni-prediction motion vector, either Mv1 or Mv2, is stored for the 4×4 grid located in the non-weighted area. For the weighted area, a bi-prediction motion vector is stored for the 4×4 grid. The bi-prediction motion vector may be derived from Mv1 and Mv2 according to the following rules:

(i) If Mv1 and Mv2 have motion vectors from different directions (L0 or L1), Mv1 and Mv2 are combined to form the bi-prediction motion vector. These vectors may be equally weighted in some examples, and weighted differently in other examples.

(ii) if both Mv1 and Mv2 are from the same (L0 for L1) direction:
    a. If the reference picture of Mv2 is the same as a picture in the L1 (or L0) reference picture list, Mv2 is scaled to the picture. Mv1 and the scaled Mv2 are combined to form the bi-prediction motion vector.
    b. If the reference picture of Mv1 is the same as a picture in the L1 (or L0) reference picture list, Mv1 is scaled to the picture. The scaled Mv1 and Mv2 are combined to form the bi-prediction motion vector.

c. Otherwise, only Mv1 is stored for the weighted area.

According to some embodiments, the triangular prediction unit mode is applied to CUs in the skip or merge mode. Generally, the block size of the CUs is not smaller than 8×8. However, embodiments of the present disclosure are not limited to this minimum size. For a CU coded in a skip or merge mode, a CU level flag may be signalled to indicate whether the triangular prediction unit mode is applied for the current CU. When the triangular prediction unit mode is applied to the CU, an index indicating the direction for splitting the CU into two triangular prediction units and the motion vectors of the two triangular prediction units, may be signalled. The index may range from 0 to 39. A look-up table may be used for deriving the splitting direction and motion vectors from the index. For example, the look-up table may associate each index with a splitting direction, a motion vector, and a reference picture.

Generally, a motion vector is used for finding a reference block from another reference picture other than the current picture. When triangle prediction unit mode is used, prediction modes that use motion vectors do not, specify how to use both a block vector and a motion vector. Accordingly, there is a need to develop methods to support the method of using the triangle prediction unit mode when both intra block copy and inter motion compensation are present.

According to some embodiments, when forming a uni-prediction candidate list for the triangle prediction unit mode, block vectors are excluded from the uni-prediction list. For example, when a neighboring block is coded in the IBC mode, the block vector of the neighboring block is considered as unavailable so that the block vector does not appear in the uni-prediction candidate list for the triangle prediction unit mode.

According to some embodiments, a candidate list generated for the triangle prediction unit mode includes both block vectors and motion vectors. In some embodiments, if a block vector is listed in the candidate list, the restrictions on this block vector may be imposed on other block vectors (e.g., any block vector in the current picture or in the candidate list). For example, some of these restrictions specify that a block vector should be pointing to a valid reference area assuming the whole coding unit is coded using this block vector, not just the partition that uses this block vector.

In some embodiments, if one candidate is a motion vector (e.g., referred to as a temporal reference picture) and one candidate is a block vector (e.g., referred to as the current picture), then, the two reference pictures for the two prediction units are considered different, and the 2nd weighting factor group is used. In some embodiments, if both candidates are block vectors, then the two reference pictures for the two prediction, units are considered the same, and the 1st weighting factor group is used. In some embodiments, if both existing candidates are motion vectors, two prediction units may generated using one or more conventional methods known to one of ordinary skill in the art.

According to some embodiments, when lama and chroma units have separate coding tree structures (e.g., dual-tree structure), the triangle prediction unit mode is not used. For example, the triangle prediction mode may be disabled when the luma and chroma units have separate coding tree structures.

According to some embodiments, when the candidate list is not filled with five candidates, default block vectors may be used to fill up the candidate list. These default block vectors may be in addition to the zero motion vector. In some examples, block vectors such as (−w, 0), (−2w, 0), (0, −h), (0, −2h), (−w, −h), etc, may be used as the default block vectors, where w and h are the width and height, respectively of the current coding block. The default block vectors may be put in front of the zero motion vector(s) or behind the zero motion vector(s) in the candidate list.

Motion vector storage in the weighted, area of the triangle prediction mode may be performed in accordance with the following embodiments, which may be combined or used separately.

In some embodiments, if a block vector is used for one triangular partition and a motion vector is used in the other triangular partition, the block vector is not stored in the weighted area, and the motion vector is stored in the weighted area.

In some embodiments, if a block vector is used for one triangular partition and a motion vector is used in the other triangular partition, the block vector and motion vector are stored using bi-prediction. For example, the block vector may be stored in the L0 bi-predictor, and the motion, vector may be stored in the L1 bi-predictor, in another example, the block vector may, be stored in the L1 bi-predictor, and the motion vector may be stored in the L0 bi-predictor. In another example, the vector from the first triangular prediction unit (e.g., 1012 or 1016 in FIG. 10) is stored in the L0 bi-predictor, and the vector from the second triangular prediction unit (e.g., 1014 or 1018 in FIG. 10) is stored in the L1 bi-predictor. In another example, the vector from the first triangular prediction unit (e.g., 1012 or 1016 in FIG. 10) is stored in the L1 bi-predictor, and the vector from the second triangular prediction unit (e.g., 1014 or 1018 in FIG. 10) is stored in the L0 bi-predictor.

According to some embodiments, if storing block vectors using bi-prediction, is allowed, the block vectors are stored in the weighted area if the block vectors are used in both triangular prediction partitions. In some examples, two block vectors form a bi-prediction block vector with the first block vector from the first triangular prediction unit stored in L0 and the second block vector from the triangular prediction unit stored in L1.

According to some embodiments, if the IBC mode is allowed, only as a uni-prediction mode, one block vector in the weighted area is stared if block vectors are used in both partitions. In one example, a block vector from the first triangular prediction unit is stored. In another example, a block vector from the second triangular prediction unit is stored. In another example, the stored block vector is an average of the block vector from the first triangular prediction unit and the block vector from the second triangular prediction unit.

Figure 14:
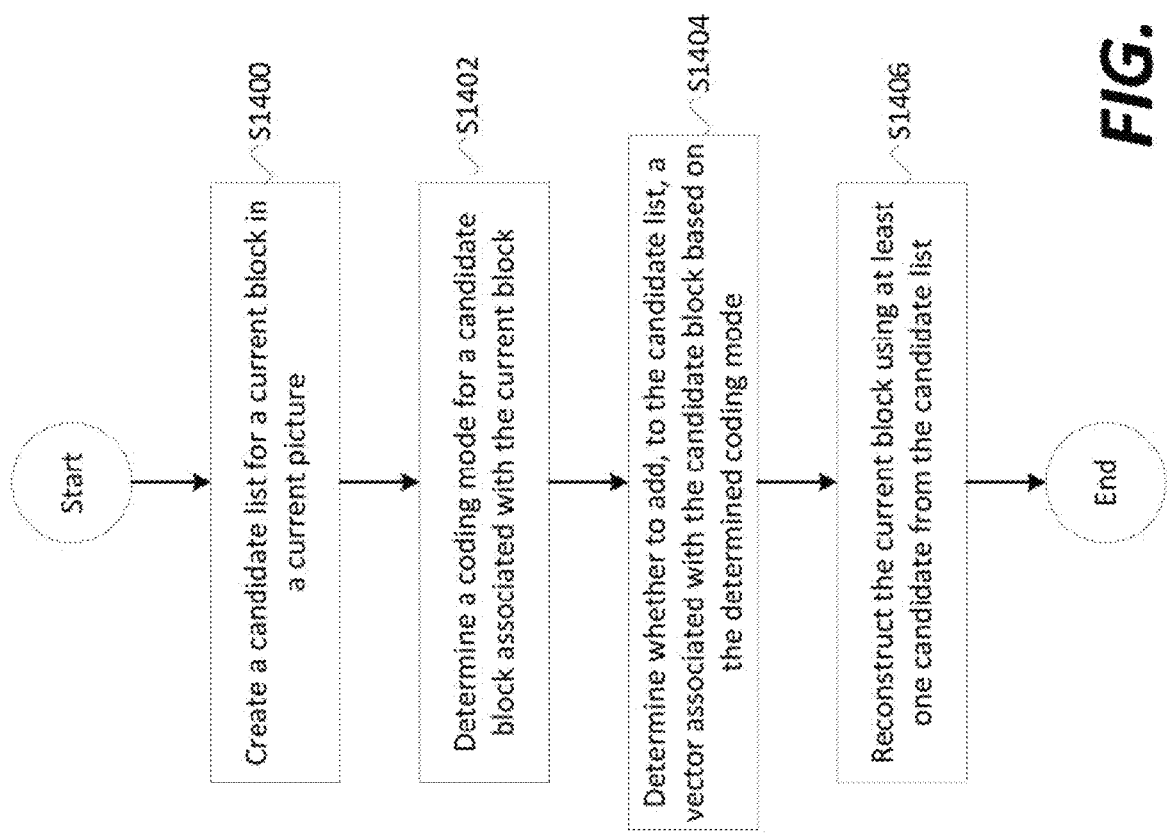
FIG. 14 shows a flow chart of a decoding process in accordance with an embodiment of the present disclosure.

FIG. 14 illustrates an embodiment of a process according to an embodiment of the present disclosure. In various embodiments, the process illustrated in FIG. 14 is executed by processing circuitry, such as the processing circuitry in the terminal devices (210), (220), (230), and (240), the processing circuitry that performs functions of the video decoder (310), (410), or (710), and the like. In some embodiments, the process illustrated in FIG. 14 is implemented by software instructions, thus, when the processing circuitry executes the software instructions, the processing circuitry performs the process illustrated in FIG. 14.

The process illustrated in FIG. 14 may start at step (S1400) where a candidate list is created for a current block in a current picture. This candidate list may be a merge candidate list or a uni-candidate list. The process proceeds to step (S1402) where a coding mode for a candidate block associated with the current block is determined. For example the coding mode may be the IBC mode or the triangular intra prediction mode.

The process proceeds to step (S1404) where it is determined to add, to the candidate list, a vector associated with the candidate block based on the determined coding mode. In this regard, the vector associated with the candidate block may be added to the candidate list in accordance with one of the embodiments described above. The process proceeds to step (S1406), where the current block is reconstructed using at least one candidate from the candidate list. The process illustrated in FIG. 14 may terminate after step (S1406).

The techniques described above, can be implemented as computer software using computer-readable instructions and, physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, interact of things devices, and the like.

Figure 15:
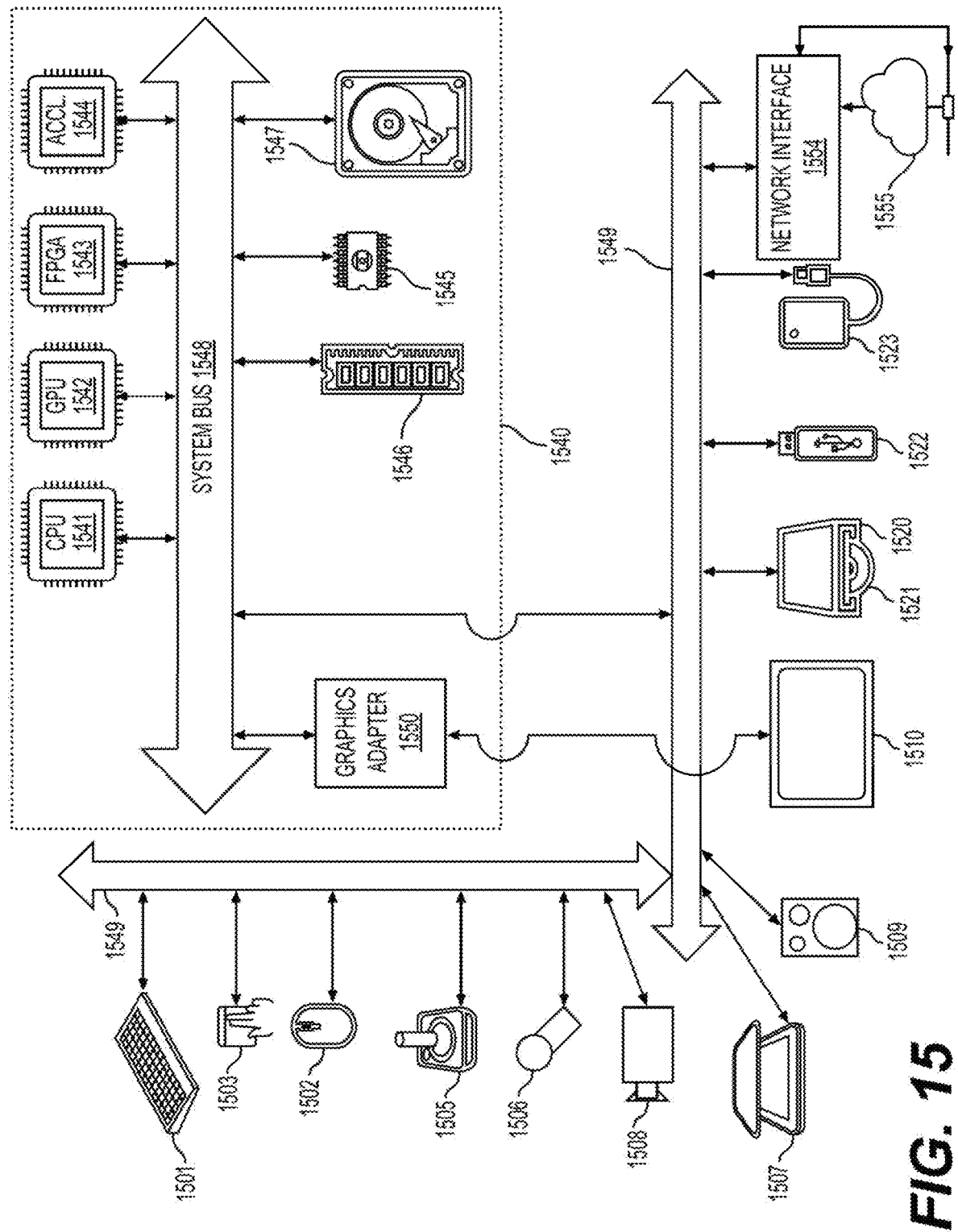
FIG. 15 is a schematic illustration of a computer system in accordance with an embodiment of the present disclosure.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) ma also include certain human interface output devices. Such human interface output devices may be stimulating the senses of one or more human users through, for example, tactile output, sound, light, and smell/taste, Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including, CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hard-wired or otherwise embodied in a circuit (for example: accelerator (1541)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD Liquid-Crystal Display
OLED: Organic Light-Emitting Diode
CD: Compact Disc
DVD: Digital Video Disc
ROM: Read-Only Memory
RAM: Random Access Memory
ASIC: Application-Specific integrated Circuit
PLD: Programmable Logic Device
LAN: Local Area Network
GSM: Global System for Mobile communications
LTE: LOBR-Tenn Evolution
CANBus: Controller Area Network Bus
USB: Universal Serial Bus
PCI: Peripheral Component interconnect
FPGA: Field Programmable Gate Areas
SSD: solid-state drive
IC: integrated Circuit
CU: Coding Unit While this disclosure has described several exemplary embodiments, there are alterations, permutations, and various substitute equivalents, which fall within the scope of the disclosure. It will thus be appreciated that those skilled in the an be able to devise numerous systems and methods which, although not explicitly shown or described herein, embody the principles of the disclosure and are thus within the spirit and scope thereof.

(1) A method of video decoding includes creating a candidate list for a current block in a current picture included in a coded video bitstream; determining a coding mode for a candidate block associated with the current block; determining whether to add, to the candidate list, a vector associated the candidate block based on the determined coding mode; and reconstructing the current block using at least one candidate from the candidate list.

(2) The method of video decoding according to feature (2), in which the current block is coded in the intra-inter blending, mode, the candidate list is a merge candidate list, and the candidate block is a merge candidate.

(3) The method of video decoding according to feature (2), in which in response to a determination that the merge candidate is coded in an intra block copy mode, a block vector associated with the merge candidate is excluded from the merge candidate list.

(4) The method of video decoding according to feature (2), in which in response to a determination that the merge candidate is coded in an intra block copy mode, a block vector associated with the merge candidate is added to the candidate list as an inter prediction part in the intra-inter blending mode.

(5) The method of video decoding according to feature (4), in which a block vector is stored for each block in the current picture coded in the intra inter blending mode and having an inter prediction part generated, by the corresponding block vector.

(6) The method of video decoding according to any one of features (1)-(5), in which the current block is coded in, the triangle prediction unit mode, the candidate list is a uni-prediction candidate list, and the candidate block is a block neighboring the current block.

(7) The method of video decoding according to feature (6), in which in response to a determination that the neighboring block is coded in an intra block copy mode, a block vector associated with the neighboring block is excluded from the uni-prediction candidate list.

(8) The method of video decoding according to feature (6), in which in response to a determination that the neighboring block is coded in an intra block copy mode, a block vector associated with the neighboring block is added to the uni-candidate list.

(9) The method of video decoding according to feature (8), in which the block vector and a motion vector associated with the current block are stored as bidirectional predictors.

(10) The method of video decoding according to feature (9), in which the block vector is stored as one of the L0 vector and the L1 vector, and the motion vector is stored as the other of the L0 vector and the L1 vector.

(11) A video decoder for video decoding including processing circuitry configured to create a candidate list for a current block in a current picture included in a coded video bitstream, determine a coding mode for a candidate block associated with the current block, determine whether to add, to the candidate list, a vector associated the candidate block based on the determined coding mode, and reconstruct the current block using at least one candidate from the candidate list.

(12) The video decoder according to feature (11), in which the current block is coded in the intra inter blending mode, the candidate list is a merge candidate list, and the candidate block is a merge candidate.

(13) The video decoder according to feature (12), in which in response to a determination that the merge candidate is coded in an intra block copy mode, a block vector associated with the merge candidate is excluded from the merge candidate list.

(14) The video decoder according to feature (12), in which in response to a determination that the merge candidate is coded in an intra block copy mode, a block vector associated with the merge candidate is added to the candidate list as an inter prediction part in the intra-inter blending mode.

(15) The video decoder according to feature (14), in which a block vector is stored for each block in the current picture coded in the intra-inter blending; mode and having an inter prediction part generated by the corresponding block vector.

(16) The video decoder according to any one of features (11)-(15), in which the current block is coded in the triangle prediction unit mode, the candidate list is a uni-prediction candidate list, and the candidate block is a block neighboring the current block.

(17) The video decoder according to feature (16), in which, in response to a determination that the neighboring block, is coded in an intra block copy mode, a block vector associated with the neighboring block is excluded from the trim-prediction candidate list.

(18) The video decoder according to feature (16), in which in response to a determination that the neighboring block is coded in an intra block copy mode, a block vector associated with the neighboring block is added to the uni-candidate list.

(19) The video decoder according to feature (18), in winch the block vector and a motion vector associated with the current block are stored as bidirectional predictors.

(20) A non-transitory computer readable medium having instructions stored therein, which when executed by a processor in a video decoder causes the processor to execute a method including creating a candidate list for a current block in a current picture included in a coded video bitstream; determining a coding mode for a candidate block associated with the current block, determining whether to add, to the candidate list, a vector associated the candidate block based on the determined coding mode; and reconstructing the current block using at least one candidate from the candidate list.

What is claimed is:

1. A method of video processing comprising:
   determining a coding mode for a candidate block associated with a current block in a current picture;
   adding a block vector associated with the candidate block to a candidate list in response to the determined coding mode indicating that (i) the current block is coded in one of an intra-inter blending mode or a triangle prediction unit mode, (ii) a luma component and a chroma component of the current block have a same coding tree structure, and (iii) the candidate block not being coded in an intra block copy mode; and
   reconstructing the current block based on at least one candidate from the candidate list.

2. The method of video processing according to claim 1, further comprising:
   receiving a coded video bitstream that includes the current picture.

3. The method of video processing according to claim 1, further comprising:
   generating a coded video bitstream based on the at least one candidate from the candidate list.

4. The method of video processing according to claim 1, wherein the current block is coded in the intra-inter blending mode, the candidate list is a merge candidate list, and the candidate block is a merge candidate.

5. The method of video processing according to claim 4, wherein the adding comprises:
   determining that the block vector associated with the merge candidate is not added to the merge candidate list based on a determination that the merge candidate is coded in the intra block copy mode.

6. The method of video processing according to claim 1, wherein the current block is coded in the triangle prediction unit mode, the candidate list is a uni-prediction candidate list, and the candidate block is a block neighboring the current block.

7. The method of video processing according to claim 6, wherein the adding comprises:
   determining that the block vector associated with the candidate block is not added to the uni-prediction candidate list based on a determination that the candidate block is coded in the intra block copy mode.

8. A video processing apparatus, comprising:
   processing circuitry configured to:
      determine a coding mode for a candidate block associated with a current block in a current picture;
      add a block vector associated with the candidate block to a candidate list in response to the determined coding mode indicating that (i) the current block is coded in one of an intra-inter blending mode or a triangle prediction unit mode, (ii) a luma component and a chroma component of the current block have a same coding tree structure, and (iii) the candidate block not being coded in an intra block copy mode; and
      reconstruct the current block based on at least one candidate from the candidate list.

9. The video processing apparatus according to claim 8, wherein the processing circuitry is configured to:
   receive a coded video bitstream that includes the current picture.

10. The video processing apparatus according to claim 8, wherein the processing circuitry is configured to:
generate a coded video bitstream based on the at least one candidate from the candidate list.

11. The video processing apparatus according to claim 8, wherein the current block is coded in the intra-inter blending mode, the candidate list is a merge candidate list, and the candidate block is a merge candidate.

12. The video processing apparatus according to claim 11, wherein the processing circuitry is configured to:
determine that the block vector associated with the merge candidate is not added to the merge candidate list based on a determination that the merge candidate is coded in the intra block copy mode.

13. The video processing apparatus according to claim 8, wherein the current block is coded in the triangle prediction unit mode, the candidate list is a uni-prediction candidate list, and the candidate block is a block neighboring the current block.

14. The video processing apparatus according to claim 13, wherein the processing circuitry is configured to:
determine that the block vector associated with the candidate block is not added to the uni-prediction candidate list based on a determination that the candidate block is coded in the intra block copy mode.

15. A non-transitory computer readable medium having instructions stored therein, which when executed by a processor in a video processing apparatus causes the processor to perform:
determining a coding mode for a candidate block associated with a current block in a current picture;
adding a block vector associated with the candidate block to a candidate list in response to the determined coding mode indicating that (i) the current block is coded in one of an intra-inter blending mode or a triangle prediction unit mode, (ii) a luma component and a chroma component of the current block have a same coding tree structure, and (iii) the candidate block not being coded in an intra block copy mode; and
reconstructing the current block based on at least one candidate from the candidate list.

16. The non-transitory computer readable medium according to claim 15, wherein the instructions further cause the processor to perform:
receiving a coded video bitstream that includes the current picture.

17. The non-transitory computer readable medium according to claim 15, wherein the instructions further cause the processor to perform:
generating a coded video bitstream based on the at least one candidate from the candidate list.

18. The non-transitory computer readable medium according to claim 15, wherein the current block is coded in the intra-inter blending mode, the candidate list is a merge candidate list, and the candidate block is a merge candidate.

19. The non-transitory computer readable medium according to claim 18, wherein the adding comprises:
determining that the block vector associated with the merge candidate is not added to the merge candidate list based on a determination that the merge candidate is coded in the intra block copy mode.

20. The non-transitory computer readable medium according to claim 15, wherein the current block is coded in the triangle prediction unit mode, the candidate list is a uni-prediction candidate list, and the candidate block is a block neighboring the current block.

* * * * *